United States Patent
Stachowiak et al.

(10) Patent No.: US 8,479,829 B2
(45) Date of Patent: Jul. 9, 2013

(54) ALIGNMENT OF BOP STACK TO FACILITATE USE OF A ROTATING CONTROL DEVICE

(71) Applicant: Halliburton Energy Services, Inc., Houston, TX (US)

(72) Inventors: Robert S. Stachowiak, Commerce, TX (US); James C. T. Parlee, Spruce Grove, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/628,984

(22) Filed: Sep. 27, 2012

(65) Prior Publication Data

US 2013/0032360 A1 Feb. 7, 2013

Related U.S. Application Data

(63) Continuation of application No. PCT/US2011/056274, filed on Oct. 14, 2011, which is a continuation-in-part of application No. 12/965,844, filed on Dec. 11, 2010, now Pat. No. 8,109,337.

(30) Foreign Application Priority Data

Jan. 8, 2010 (WO) ................ PCT/US2010/020410

(51) Int. Cl.
*E21B 33/06* (2006.01)
(52) U.S. Cl.
USPC .......................................... 166/379; 166/368
(58) Field of Classification Search
USPC ................... 166/379, 97.5, 368, 84.3
See application file for complete search history.

(56) References Cited

U.S. PATENT DOCUMENTS

| 2,846,013 | A | | 8/1958 | Davis |
| 2,963,090 | A | | 12/1960 | Cole et al. |
| 3,095,927 | A | | 7/1963 | Rhodes |
| 4,215,747 | A | | 8/1980 | Cox et al. |
| 4,289,294 | A | * | 9/1981 | McLean ......................... 251/62 |

(Continued)

FOREIGN PATENT DOCUMENTS

| DE | 29901351 | 4/1999 |
| GB | 130856 A | 8/1919 |

(Continued)

OTHER PUBLICATIONS

International Search Report with Written Opinion issued Jul. 28, 2010 for PCT Patent Application No. PCT/US10/020410, 15 pages.

(Continued)

*Primary Examiner* — Daniel P Stephenson
(74) *Attorney, Agent, or Firm* — Smith IP Services, P.C.

(57) ABSTRACT

An alignment system can include at least one alignment device positioned between two flanges, the alignment device having a greater thickness on one side of the alignment device than on an opposite side of the alignment device, and the alignment device having circumferential slots through which the two flanges are coupled. A method of producing a relative angular offset between two flanges can include positioning at least one alignment device in a desired azimuthal orientation between the flanges, the alignment device including preformed circumferential slots which permit the alignment device to align with a bolt hole pattern of the flanges, and securing the alignment device between the flanges, thereby producing the angular offset.

31 Claims, 6 Drawing Sheets

U.S. PATENT DOCUMENTS

| | | | |
|---|---|---|---|
| 4,647,084 A | 3/1987 | Hagin et al. | |
| 6,036,205 A * | 3/2000 | Schlosser et al. | 280/86.753 |
| 6,431,659 B1 * | 8/2002 | Somppi | 301/132 |
| 6,470,975 B1 | 10/2002 | Bourgoyne et al. | |
| 7,040,411 B2 | 5/2006 | Kainer et al. | |
| 7,144,049 B2 | 12/2006 | Stangeland et al. | |
| 7,198,303 B2 | 4/2007 | Brophy, III et al. | |
| 8,109,337 B2 | 2/2012 | Parlee | |
| 8,261,840 B2 | 9/2012 | Parlee | |
| 2006/0037744 A1 | 2/2006 | Hughes et al. | |
| 2007/0114039 A1 | 5/2007 | Hobdy et al. | |
| 2009/0101411 A1 * | 4/2009 | Hannegan et al. | 175/25 |
| 2011/0168405 A1 | 7/2011 | Parlee | |

FOREIGN PATENT DOCUMENTS

| | | |
|---|---|---|
| GB | 816559 A | 7/1959 |
| GB | 2247723 A | 3/1992 |
| GB | 2340570 A | 2/2000 |
| WO | 2010071627 A1 | 6/2010 |

OTHER PUBLICATIONS

Search Report and Written Opinion issued Jul. 9, 2012 for International Application PCT/US11/56274, 10 pages.

Office Action issued Feb. 17, 2012 for U.S. Appl. No. 13/341,297, 9 pages.

International Search Report with Written Opinion issued Jul. 28, 2010 for International Patent Application Serial No. PCT/US10/020410, 15 pages.

Office Action issued Jun. 16, 2011 for U.S. Appl. No. 12/965,844, 8 pages.

International Search Report with Written Opinion issued Jul. 9, 2012 for International Patent Application Serial No. PCT/US11/056274, 10 pages.

\* cited by examiner

ALIGNMENT OF BOP STACK TO FACILITATE USE OF A ROTATING CONTROL DEVICE

CROSS-REFERENCE TO RELATED APPLICATION

The present application is a continuation of International application serial no. PCT/US11/56274, filed 14 Oct. 2011, which is a continuation-in-part of U.S. application Ser. No. 12/965844, filed 11 Dec. 2010, now issued U.S. Pat. No. 8,109,337, and which claims priority to International application serial no. PCT/US10/20410, filed 8 Jan. 2010. The entire disclosures of these prior applications are incorporated herein by this reference.

BACKGROUND

The present disclosure relates generally to connecting components with flanged connections and, in specific examples described herein, more particularly provides for alignment of a BOP stack to facilitate use of a rotating control device.

In various industries, assemblies of components are connected using flanged connections. Typically, the mating surfaces of flanges in the flanged connections are intended to be oriented in a particular direction relative to the associated components being connected. If, however, the flanges are not suitably oriented, or the intended direction changes, the connected components will not be appropriately aligned with each other, or with other equipment.

Therefore, it will be appreciated that improvements are needed in the art of aligning components connected with flanged connections.

DETAILED DESCRIPTION

This disclosure relates to alignment of equipment, wherein components are connected using flanges. In specific examples described below, a system and method are provided for alignment of blowout preventers (BOP's), rotating control devices (RCD's, also known as rotating control heads, rotating diverters, and rotating blowout preventers) with a rig floor and/or a casing string. However, the principles of this disclosure are not limited to only these examples.

In conventional well construction practice, a flanged casing bowl is typically welded to the top of casing at a wellhead. The casing bowl allows secure, sealed attachment of equipment (such as blowout preventers and a rotating control device, etc.) to the casing at the surface during well drilling and completion operations.

Unfortunately, casing bowls are not always welded to the top of the casing so that they are level (i.e., with a top flange surface of the casing bowl perfectly horizontal). Thus, when the BOP's and RCD are bolted to the casing bowl, they are also not level, and any drill string or completion string which passes through the BOP's and RCD tend to rub on the inner surfaces of the BOP's and RCD. This causes damage to the seals and various other internal components of the BOP's and RCD, requiring frequent, expensive and time-consuming maintenance for these components.

The BOP's and RCD are preferably aligned with an opening in a rig floor above the BOP's and RCD. If a rotary table is used in the rig floor, then a longitudinal axis of the BOP's and RCD is preferably axially aligned with the opening in the rotary table. However, a rig can settle during drilling and/or completion operations, and so it may be desirable to re-align the BOP's and RCD with the opening in the rig floor if misalignment does occur.

In the examples described below, one or more alignment devices in the form of wedge-shaped spacers (which are thinner on one side than on an opposite side) are interposed between the casing bowl flange and a flange of the BOP's and RCD assembly. In this way, any deviation of the casing bowl flange from horizontal can be corrected prior to attachment of the BOP's and RCD. Multiple alignment devices may be used, if necessary.

Figure 1:
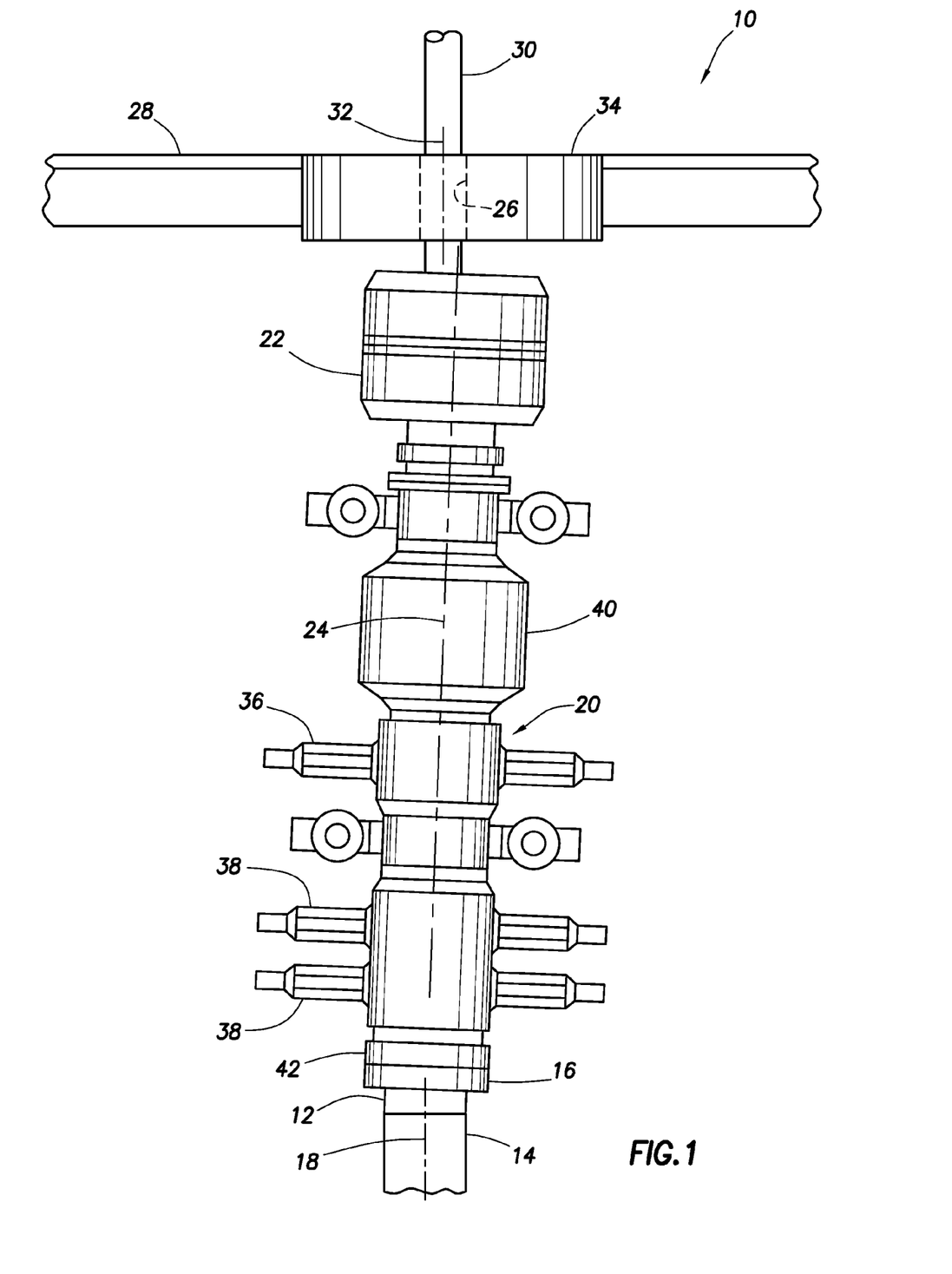
FIG. 1 is a representative elevational view of a system and associated method which can embody principles of this disclosure.

Representatively illustrated in FIG. 1 is an alignment system 10 and associated method which can embody principles of this disclosure. In the system 10, a casing bowl 12 has been welded to the top of a casing string 14 at a wellhead. Unfortunately, a flange 16 of the casing bowl 12 is not horizontal and, thus, is not oriented in a plane orthogonal to a longitudinal axis 18 of the casing string 14.

As a result, when a blowout preventer stack 20 and a rotating control device 22 are connected to the casing bowl 12, a longitudinal axis 24 of the blowout preventer stack and rotating control device does not coincide with the axis 18 of the casing string 14. Another result is that the axis 24 is not aligned with an opening 26 in a rig floor 28 through which a tubular string 30 (such as a drill string, work string, test string, completion string, etc.) extends.

The axis 24 is also not aligned with a longitudinal axis 32 of the tubular string 30 and opening 26, and so the tubular string will rub against the interior of the blowout preventer stack 20 and rotating control device 22 as it is conveyed into and out of the casing string 14, and/or as it is rotated (e.g., using a rotary table 34). This could damage internal features of the blowout preventer stack 20 and rotating control device 22, and/or could prevent effective sealing between the tubular string 30 and the blowout preventer stack and/or rotating control device.

As depicted in FIG. 1, the blowout preventer stack 20 includes ram-type blowout preventers 36, 38 and an annular blowout preventer 40. A lower flange 42 of the lower blowout preventer 38 attaches to the flange 16 of the casing bowl 12. The blowout preventers 36, 38, 40 are used to seal off the wellhead and thereby prevent undesired escape of fluids from the well in emergency situations (e.g., to prevent an uncontrolled blowout), or to seal off the annular space about the tubular string 30 in well control situations (e.g., when an excessive kick occurs in drilling operations). Rotation or other manipulation of the tubular string 30 would cease prior to operation of the blowout preventers 36, 38, 40.

In contrast, the rotating control device 22 is used to seal off the annular space about the tubular string 30 during drilling operations (i.e., while the tubular string is being rotated and/or lowered into the well to further drill a wellbore, although rotation of the tubular string is not necessary if a mud motor is used to rotate a drill bit on the lower end of the tubular string). The rotating control device 22 may be used in managed pressure drilling (such as, in underbalanced drilling, at balance drilling or slightly overbalanced drilling operations). However, it should be understood that use of the rotating control device 22 is not necessary in keeping with the principles of this disclosure.

Figure 2:
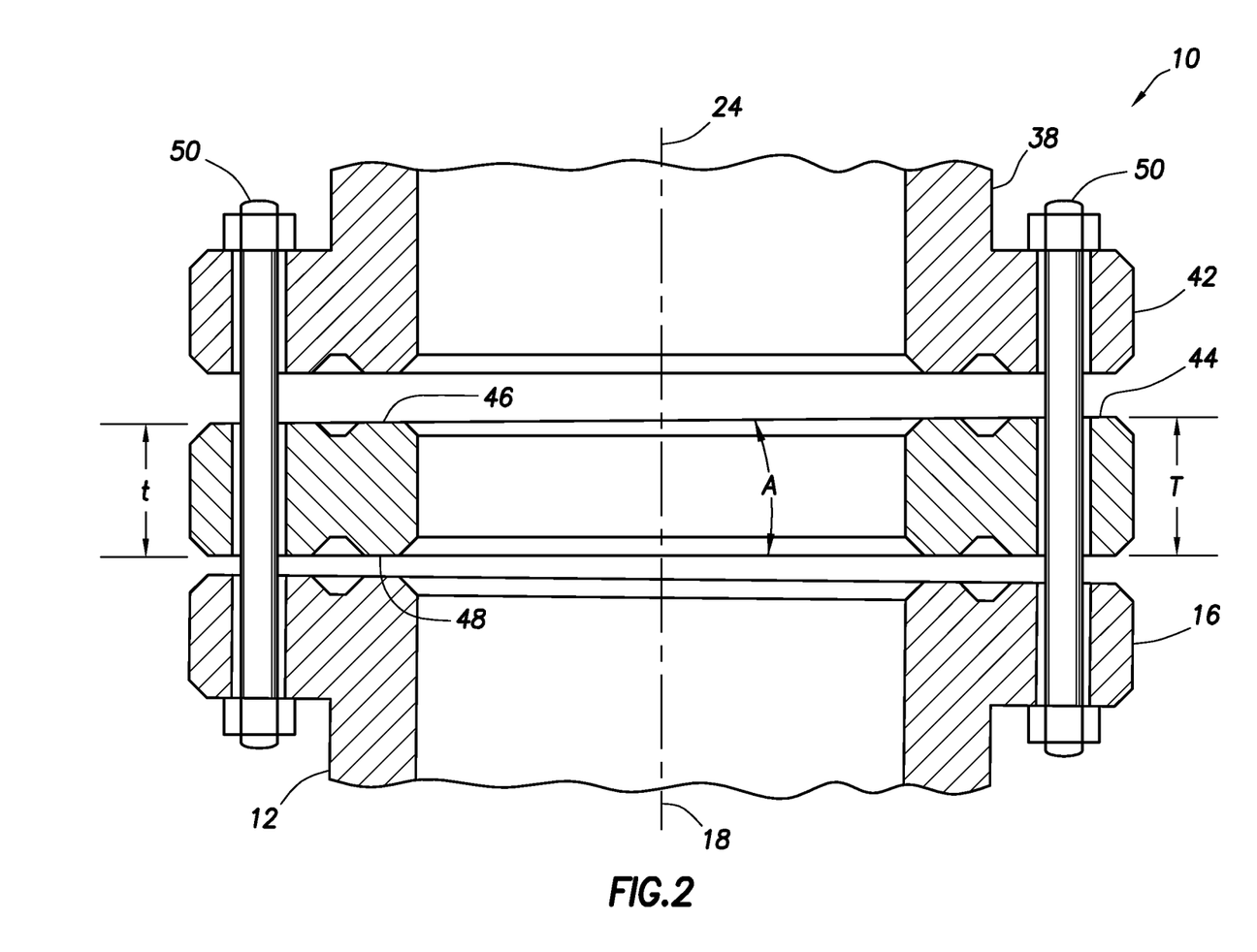
FIG. 2 is an enlarged scale representative cross-sectional view of flanges and an alignment device which may be used in the system and method.

To correct the misalignment of the axis 24 relative to the axes 18, 32 (and the associated misalignment of the blowout preventer stack 20 and rotating control device 22 with the casing string 14, rig floor opening 26 and tubular string 30), the system 10 utilizes one or more alignment devices 44 interposed between the flanges 16, 42 to produce an angular offset which compensates for the misalignment of the axis 24 relative to the axes 18, 32. An enlarged scale schematic cross-sectional view of the flanges 16, 42 and the alignment device 44 is representatively illustrated in FIG. 2.

Note that the alignment device 44 has opposing planar flange surfaces 46, 48 which are angled relative to one another, resulting in the alignment device having a greater thickness T on one side as compared to a thickness t on an opposite side. Thus, when the alignment device 44 is clamped between the flanges 16, 42 (such as, by tightening bolts 50), an angular offset A will be produced, thereby aligning the axes 18, 24 and aligning the axis 24 with the axis 32 (not visible in FIG. 2).

In some circumstances, a single alignment device 44 may not be sufficient to produce a desired angular offset A between the flanges 16, 42, in which case multiple alignment devices may be used. An example is representatively illustrated in FIG. 3.

Figure 5:
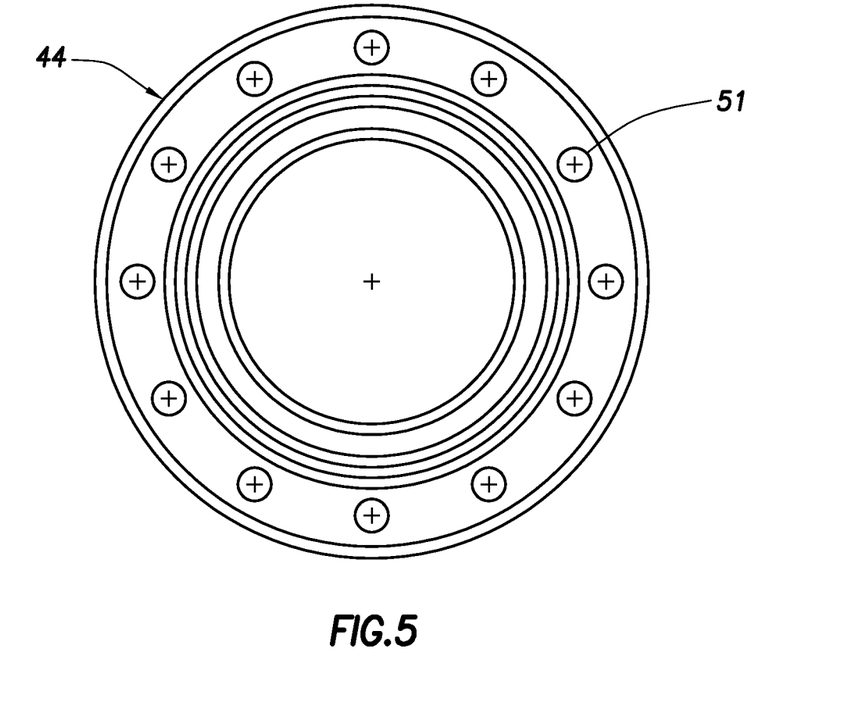
FIG. 5 is a representative plan view of one configuration of the alignment device.

Another advantage derived from use of multiple alignment devices 44 is that the angular offset A produced can be varied by rotating one of the alignment devices relative to another alignment device. The increments of adjustment in the depicted examples is determined by the number of bolts 50 (and associated bolt holes 51 in the flanges 16, 42). For example, as illustrated in FIG. 5, if there are twelve bolts 50 (and associated bolt holes 51, although it is not necessary for the number of bolts and the number of holes to be the same) used to clamp the flanges 16, 42 to each other, then the number of increments of adjustment is also twelve, with each increment equaling thirty degrees (360 degrees/12 increments) of relative rotation between the alignment devices 44.

Figure 3:
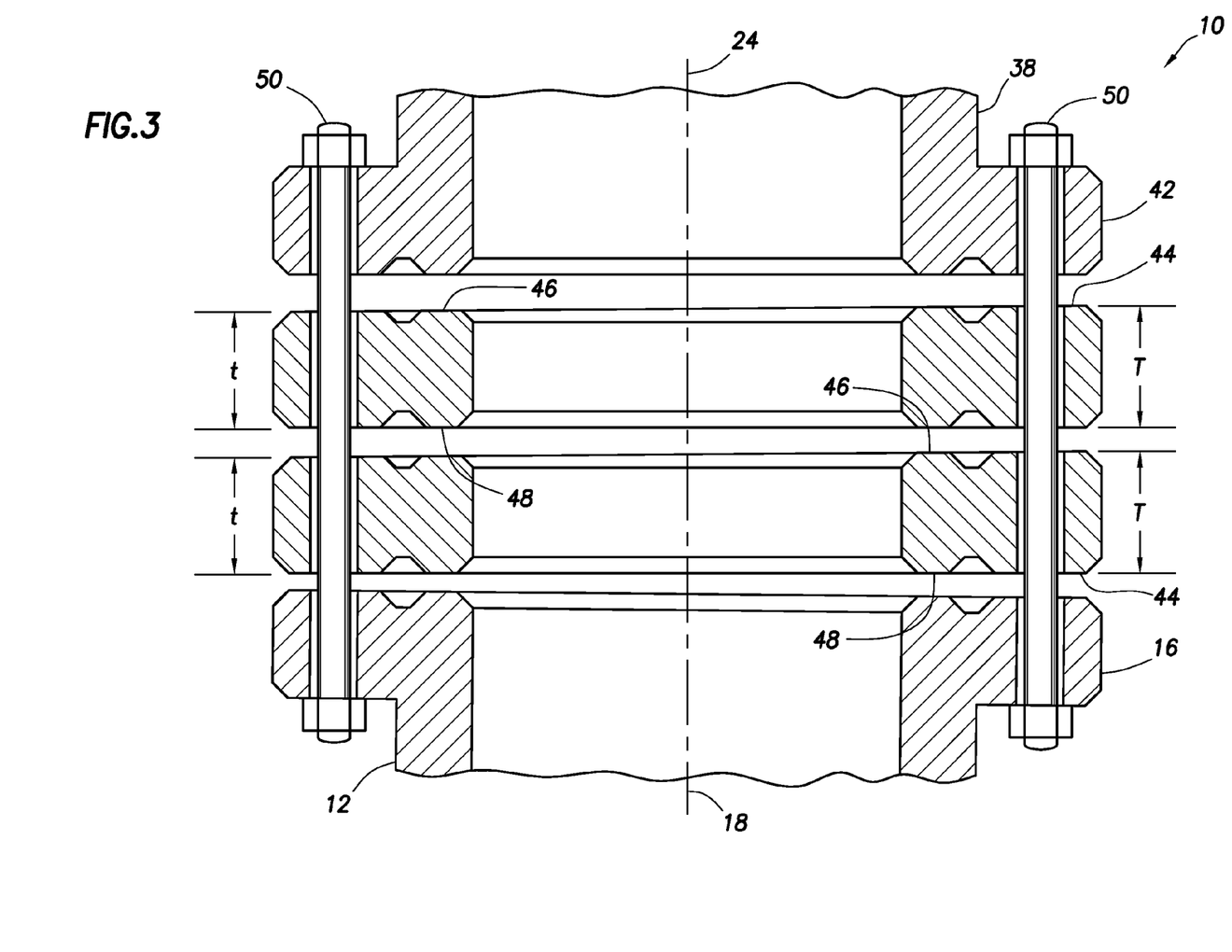
FIG. 3 is a representative cross-sectional view of another configuration of the flanges and multiple alignment devices.
Figure 4:
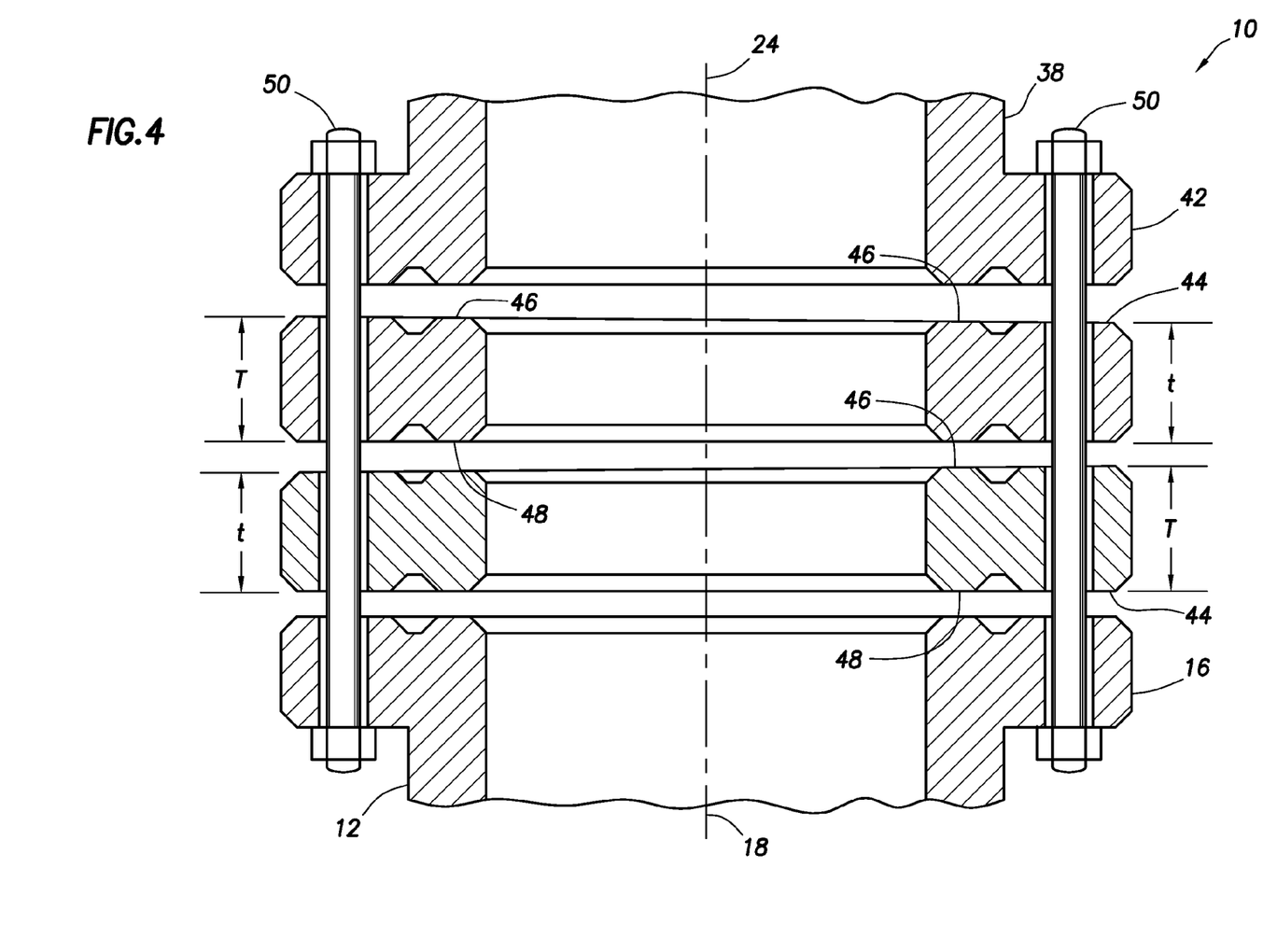
FIG. 4 is a representative cross-sectional view of yet another configuration of the flanges and multiple alignment devices.

The maximum angular offset A between the flanges 16, 42 is depicted in FIG. 3, with the greatest thicknesses T of the alignment devices 44 overlapping each other. In FIG. 4, the minimum angular offset A (zero angular offset) is depicted, with the greatest thickness T of one alignment device 44 overlapping the least thickness t of the other alignment device. The configuration of FIG. 4 may not be of use in a particular circumstance, since it produces no angular offset between the flanges 16, 42, but coupled with the configuration of FIG. 3, it does show the range of adjustability of the angular offset.

Note that it is not necessary in keeping with the principles of this disclosure for the increments of adjustment of the angular offset between the flanges 16, 42 to be determined by the number of bolts 50 (and associated bolt holes 51) in the flanges. For example, finer or coarser increments of adjustment could be produced by providing a greater or fewer number of bolt holes 51 in the alignment devices 44.

Figure 6A:
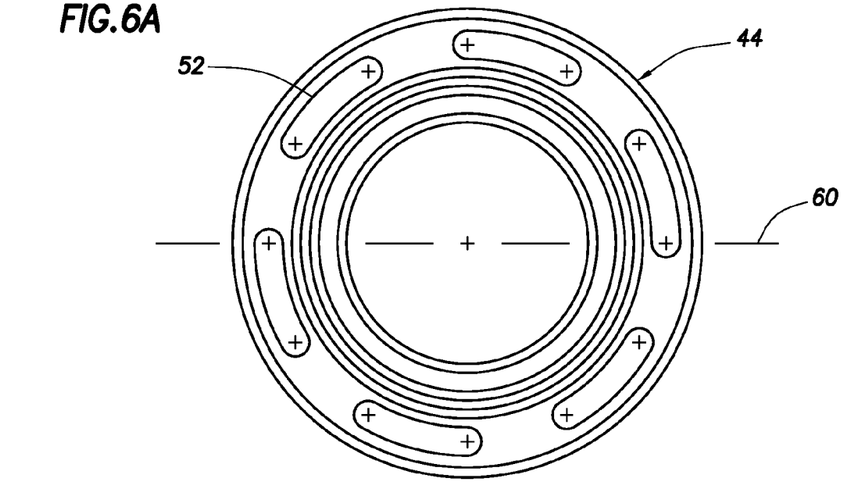
FIGS. 6A-C are representative respective plan, side and rotated plan views of a further configuration of the alignment device.
Figure 6B:
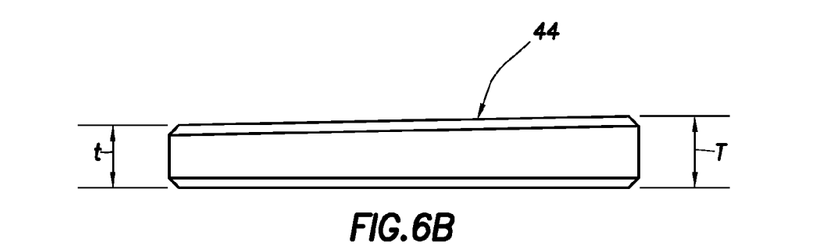
Figure 6C:
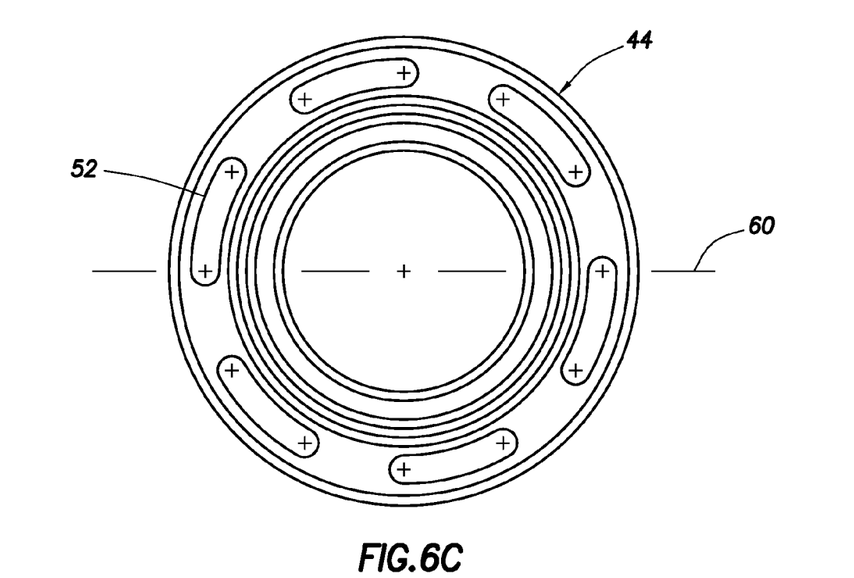

As illustrated in FIGS. 6A-C, a theoretically infinite number of angular offset adjustments could be produced by providing pre-formed circumferential slots 52 in the device(s) 44, instead of the bolt holes 51. Note that the circumferential slot pattern is not symmetric across a transverse axis 60 running through the points of greatest thickness T and least thickness t of the alignment device 44. Since the circumferential slots do not share an axis of symmetry with the overall taper of the alignment device 44, the alignment device 44 can simply be inverted, if necessary, in order to align the circumferential slots 52 with the mating flange bolt hole pattern in any desired azimuthal orientation of the alignment device 44. In this way, the angular offset adjustment capability of one or more alignment devices 44 is not limited by a fixed bolt hole pattern.

Since the bolts 50 could be subject to large bending stresses due to the angular offset between the flanges 16, 42, spherical washers of the type described in U.S. Pat. No. 7,144,049 may be used on the bolts to prevent such bending stresses.

It may now be fully appreciated that the use of the alignment device(s) 44 between the flanges 16, 42 can produce a desired angular offset A between the flanges to thereby align components on either side of the flanges and/or to align a component with another item of equipment. For example, the angular offset A between the flanges 16, 42 can align the axis 24 with the axes 18, 32, align the blowout preventer stack 20 and blowout preventers 36, 38, 40 thereof with the casing string 14 and/or opening 26 in the rig floor 28, align the rotating control device 22 with the casing string and/or opening in the rig floor, etc.

Benefits can be derived from the angular offset A even if one of the flanges 16, 42 is not initially misaligned. For example, if the rig settles (thereby misaligning the opening 26 in the rig floor 28 with the axis 24 of the blowout preventer stack 20 and rotating control device 22), the alignment device(s) 44 can be used to restore alignment, without a need to move the rig itself.

Thus, in one example, the above disclosure provides to the art a system 10 and associated method in which an angled alignment device 44 is interposed between a casing bowl flange 16 and a flange 42 of a blowout preventer 38 to thereby vertically align the blowout preventer (and associated blowout preventer stack 20 and rotating control device 22). In other examples, the flanges 16, 42 could be provided on other components, and one or more of the components could be aligned with equipment other than a rig floor 28, rotary table 34, opening 26, tubular string 30, etc.

The above disclosure also provides to the art a manner of using multiple angled alignment devices 44 between flanges 16, 42 to achieve an increased degree of adjustability of angular offset A between the flanges. Adjustment increments may be determined by the number of bolt holes 51 in the flanges 16, 42 and alignment devices 44, or a greater or lesser number of increments may be provided. A theoretically infinite number of angular offset adjustments could be produced by providing pre-formed circumferential slots 52 instead of the bolt holes 51.

The alignment device(s) 44 may be used between any types of flanges, to thereby axially align any type of components (such as pipes, valves, etc.) on opposite sides of the flanges (i.e., the components on opposite sides of the flanges are axially aligned, but one or both of the flanges may not be axially aligned with those components).

In this aspect, the components do not have to be related to wells—they could be used in any type of pipelines, processing plants, power plants, etc.

In another aspect, the alignment device(s) 44 may be used between flanges to align a component associated with one of the flanges with another item of equipment. Thus, in the examples described above, the blowout preventer stack 20 (which is associated with the flange 42) is aligned with the opening 26 in the rig floor 28 (which is not rigidly secured to either of the flanges 16, 42).

More particularly, the above disclosure provides to the art an alignment system 10 which comprises at least one alignment device 44 positioned between two flanges 16, 42, with the alignment device 44 having a greater thickness T on one side of the alignment device 44 than on an opposite side of the alignment device 44, and the alignment device 44 having pre-formed circumferential slots 52 through which the two flanges 16, 42 are coupled.

The system 10 can include multiple alignment devices 44 positioned between the flanges 16, 42.

The alignment devices 44 may be displaceable relative to each other to thereby vary an angular offset A of one flange 16 relative to the other flange 42.

One of the flanges 42 may be part of a blowout preventer 38. The alignment device 44 may align an axis 24 of the blowout preventer 38 with an axis 32 of a tubular string 30 extending through a rig floor 28.

A rotating control device 22 may be connected to the blowout preventer 38. The alignment device 44 may align an axis 24 of the rotating control device 22 with an axis 32 of a tubular string 30 extending through a rig floor 28.

One of the flanges 16 may be part of a casing bowl 12.

The alignment device 44 may align an axis 24 of a blowout preventer stack 20 and/or a rotating control device 22 with an axis 18 of a casing string 14.

Also provided by the above disclosure is a method of producing a relative angular offset A between a first flange 16 and a second flange 42. The method includes positioning at least one alignment device 44 in a desired azimuthal orientation between the first and second flanges 16, 42, wherein the alignment device 44 includes pre-formed circumferential slots 52 which permit the alignment device 44 to align with a bolt hole pattern of the first and second flanges 16, 42, and securing the alignment device 44 between the first and second flanges 16, 42, thereby producing the angular offset A.

The positioning step may include positioning multiple alignment devices 44 between the first and second flanges 16, 42. The method can include displacing a first one of the alignment devices 44 relative to a second one of the alignments devices 44, thereby varying the angular offset. The displacing step may include inverting at least one of the first and second alignment devices 44, thereby aligning the circumferential slots 52 of the at least one of the first and second alignment devices 44 with the bolt hole pattern of the first and second flanges 16, 42.

Securing the alignment device 44 may include aligning an axis 24 of a blowout preventer stack 20 and/or rotating control device 22 with an axis 18 of a casing string 14.

The first flange 16 may be part of a casing bowl 12. The second flange 42 may be part of a blowout preventer 38.

Securing the alignment device 44 may include aligning an axis 24 of the blowout preventer 38 with an axis 32 of a tubular string 30 extending through a rig floor 28.

The method may include connecting a rotating control device 22 to the blowout preventer 36, 38, 40.

Securing the alignment device 44 may include aligning an axis 24 of the rotating control device 22 with an axis 32 of a tubular string 30 extending through a rig floor 28.

The above disclosure also provides to the art a method of aligning an axis 24 of a blowout preventer stack 20 with a rig floor 28. The method includes positioning at least one alignment device 44 in a desired azimuthal orientation between a first flange 16 and a second flange 42 of the blowout preventer stack 20, wherein the alignment device 44 includes pre-formed circumferential slots 52 which permit the alignment device 44 to align with a bolt hole pattern of the first and second flanges 16, 42, and securing the alignment device 44 between the first and second flanges 16, 42, thereby producing an angular offset A of the second flange 42 relative to the first flange 16.

Securing the alignment device 44 may include aligning the axis 24 of the blowout preventer stack 20 with an axis 32 of a tubular string 30 extending through the rig floor 28.

The method may include connecting a rotating control device 22 to the blowout preventer stack 20. Securing the alignment device 44 may include aligning an axis 24 of the rotating control device 22 with an axis 32 of a tubular string 30 extending through the rig floor 28.

The positioning step may include positioning multiple alignment devices 44 between the first and second flanges 16, 42. The method may include displacing a first one of the alignment devices 44 relative to a second one of the alignments devices 44, thereby varying the angular offset. The displacing step may include inverting at least one of the first and second alignment devices 44, thereby aligning the circumferential slots 52 of the at least one of the first and second alignment devices 44 with the bolt hole pattern of the first and second flanges 16, 42.

The first flange 16 may be part of a casing bowl 12.

Securing the alignment device 44 may include aligning the axis 24 of the blowout preventer stack 20 and/or a rotating control device 22 with an axis 18 of a casing string 14.

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which are not limited to any specific details of these embodiments.

In the above description of the representative embodiments of the disclosure, directional terms, such as "above", "below", "upper", "lower", etc., are used merely for convenience in referring to the accompanying drawings.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. An alignment system, comprising:
at least one alignment device positioned between two flanges, the alignment device having a greater thickness on one side of the alignment device than on an opposite side of the alignment device, and the alignment device having pre-formed circumferential slots through which the two flanges are coupled, wherein at least one of the slots has a circumferential dimension that is longer than a radial dimension of the at least one of the slots.

2. The system of claim 1, wherein the system comprises multiple alignment devices positioned between the flanges.

3. The system of claim 2, wherein the alignment devices are displaceable relative to each other to thereby vary an angular offset of one flange relative to the other flange.

4. The system of claim 1, wherein one of the flanges is part of a blowout preventer.

5. The system of claim 4, wherein the alignment device aligns an axis of the blowout preventer with an axis of a tubular string extending through a rig floor.

6. The system of claim 4, wherein a rotating control device is connected to the blowout preventer.

7. The system of claim 6, wherein the alignment device aligns an axis of the rotating control device with an axis of a tubular string extending through a rig floor.

8. The system of claim 1, wherein one of the flanges is part of a casing bowl.

9. The system of claim 1, wherein the alignment device aligns an axis of a blowout preventer stack with an axis of a casing string.

10. The system of claim 1, wherein the alignment device aligns an axis of a rotating control device with an axis of a casing string.

11. A method of producing a relative angular offset between a first flange and a second flange, the method comprising:
    positioning at least one alignment device in a desired azimuthal orientation between the first and second flanges, wherein the alignment device includes pre-formed circumferential slots which permit the alignment device to align with a bolt hole pattern of the first and second flanges, wherein at least one of the slots has a circumferential dimension that is longer than a radial dimension of the at least one of the slots; and
    securing the alignment device between the first and second flanges, thereby producing the angular offset.

12. The method of claim 11, wherein positioning at least one alignment device comprises positioning multiple alignment devices between the first and second flanges.

13. The method of claim 12, further comprising displacing a first one of the alignment devices relative to a second one of the alignments devices, thereby varying the angular offset.

14. The method of claim 13, wherein displacing a first one of the alignment devices relative to a second one of the alignment devices further comprises inverting at least one of the first and second alignment devices, thereby aligning the circumferential slots of the at least one of the first and second alignment devices with the bolt hole pattern of the first and second flanges.

15. The method of claim 11, wherein the first flange is part of a casing bowl.

16. The method of claim 11, wherein securing the alignment device further comprises aligning an axis of a blowout preventer stack with an axis of a casing string.

17. The method of claim 11, wherein securing the alignment device further comprises aligning an axis of a rotating control device with an axis of a casing string.

18. The method of claim 11, wherein the second flange is part of a blowout preventer.

19. The method of claim 18, wherein securing the alignment device further comprises aligning an axis of the blowout preventer with an axis of a tubular string extending through a rig floor.

20. The method of claim 18, further comprising connecting a rotating control device to the blowout preventer.

21. The method of claim 20, wherein securing the alignment device further comprises aligning an axis of the rotating control device with an axis of a tubular string extending through a rig floor.

22. A method of aligning an axis of a blowout preventer stack with a rig floor, the method comprising:
    positioning at least one alignment device in a desired azimuthal orientation between a first flange and a second flange of the blowout preventer stack, wherein the alignment device includes pre-formed circumferential slots which permit the alignment device to align with a bolt hole pattern of the first and second flanges; and
    securing the alignment device between the first and second flanges, thereby producing an angular offset of the second flange relative to the first flange.

23. The method of claim 22, wherein securing the alignment device further comprises aligning the axis of the blowout preventer stack with an axis of a tubular string extending through the rig floor.

24. The method of claim 22, further comprising connecting a rotating control device to the blowout preventer stack.

25. The method of claim 24, wherein securing the alignment device further comprises aligning an axis of the rotating control device with an axis of a tubular string extending through the rig floor.

26. The method of claim 22, wherein positioning at least one alignment device comprises positioning multiple alignment devices between the first and second flanges.

27. The method of claim 26, further comprising displacing a first one of the alignment devices relative to a second one of the alignments devices, thereby varying the angular offset.

28. The method of claim 27, wherein displacing a first one of the alignment devices relative to a second one of the alignment devices further comprises inverting at least one of the first and second alignment devices, thereby aligning the circumferential slots of the at least one of the first and second alignment devices with the bolt hole pattern of the first and second flanges.

29. The method of claim 22, wherein the first flange is part of a casing bowl.

30. The method of claim 22, wherein securing the alignment device further comprises aligning the axis of the blowout preventer stack with an axis of a casing string.

31. The method of claim 22, wherein securing the alignment device further comprises aligning an axis of a rotating control device with an axis of a casing string.

* * * * *